United States Patent [19]

Shimizu et al.

[11] Patent Number: 5,177,804
[45] Date of Patent: Jan. 5, 1993

[54] WAVEGUIDE-TYPE OPTICAL SWITCH

[75] Inventors: Takeo Shimizu, Fujisawa; Hisaharu Yanagawa, Tokyo, both of Japan

[73] Assignee: The Furukawa Electric Co., Ltd., Tokyo, Japan

[21] Appl. No.: 850,465

[22] Filed: Mar. 11, 1992

[30] Foreign Application Priority Data

Mar. 15, 1991 [JP] Japan ................................ 3-51398

[51] Int. Cl.⁵ .................................................. G02B 6/26
[52] U.S. Cl. ........................................ 385/20; 385/16; 385/25; 385/49; 385/129
[58] Field of Search ................ 385/16, 17, 20, 21, 385/22, 24, 25, 49, 129, 130

[56] References Cited

U.S. PATENT DOCUMENTS

| | | | |
|---|---|---|---|
| 4,859,022 | 8/1989 | Opdahl et al. ........................ | 385/21 |
| 4,886,335 | 12/1989 | Yanagawa et al. ................... | 385/24 |
| 5,050,955 | 9/1991 | Sjölinder .............................. | 385/20 |
| 5,125,946 | 6/1992 | Bhagavatala ........................ | 385/129 X |
| 5,129,018 | 7/1992 | Poisel et al. ........................ | 385/16 |

FOREIGN PATENT DOCUMENTS

| | | | |
|---|---|---|---|
| 1-161311 | 6/1989 | Japan ................................ | 385/20 X |
| 2-199418 | 8/1990 | Japan ................................ | 385/16 X |
| 2-281225 | 11/1990 | Japan ................................ | 385/16 X |
| 2-287417 | 11/1990 | Japan ................................ | 385/16 X |

*Primary Examiner*—Brian Healy
*Attorney, Agent, or Firm*—Frishauf, Holtz, Goodman & Woodward

[57] ABSTRACT

A planar waveguide-type optical switch comprising: a first base including a substrate, a plurality of planar waveguide pairs having different optical connection functions and arranged at predetermined pair spaces on the substrate, and a set of butting end faces, the respective end faces of waveguides constituting the plurality of waveguide pairs being exposed on the butting end faces at predetermined pitches; and second and third bases each having a joint end face butted to each corresponding butting end face of the first base, and provided with at least a set of optical fiber pairs optically connected to optical transmission routes and arranged at the same pitch as the waveguides, the respective end faces of optical fibers constituting the set of optical fiber pairs being exposed on the joint end faces. In this planar waveguide type optical switch, any of the first to third bases butt-connected to one another is moved parallel for the pair space of the planar waveguide pairs along the butting end face so that at least a set of optical fiber pairs of the second and third bases connected to a predetermined planar waveguide pair out of the plurality of planar waveguide pairs are optically connected to a desired planar waveguide pair, whereby the optical transmission routes are switched.

8 Claims, 10 Drawing Sheets

WAVEGUIDE-TYPE OPTICAL SWITCH

BACKGROUND OF THE INVENTION

1. Field of the Invention

The present invention relates to a waveguide-type optical switch used to switch the optical transmission routes in an optical communication system.

2. Description of the Related Art

In an optical communication system, e.g., an optical loop network, the optical transmission line is doubled to improve the reliability of the optical transmission routes, and is switched by means of an optical switch at each station. A two-by-two photoswitch having 2-input/2-output function, as shown in FIG. 12, is generally known as an example of the optical switch adapted for this switching operation. This photoswitch is designed so that connectors 1 and 2 are joined end-to-end.

In this photoswitch, the connector 1 has input/output optical fibers 1a and 1b and a switching optical fiber 1c arranged at predetermined pitches, and the connector 2 has input/output optical fibers 2a and 2b and a switching optical fiber 2c arranged at the same pitches as those of the connector 1. The optical fibers 1c and 2c are optically connected to each other with their respective end portions curved like a loop. Conventionally, the photoswitch constitutes double optical transmission routes extending from the fiber 1a to the fiber 2b and from the fiber 1b to the fiber 2a.

In switching the optical transmission routes, the connector 1 is moved parallel for one pitch of the optical fibers, with respect to the connector 2, so that the transmission routes extends from the optical fiber 1a through the fibers 2c and 1c to the fiber 2a and from the fiber 1b to the fiber 2b, as shown in FIG. 13.

Since the respective end faces of its individual optical fibers are butted directly to one another, the photoswitch has an advantage over a switch which uses an optical connection system, such as a lens, for alignment in being able to effect low-loss operation despite the use of single-mode fibers.

As shown in FIGS. 14, 15 and 16, moreover, there are three states of connection, cross, through, and loop-back, between which the connection between two optical fiber pairs is switched.

In the case shown in FIG. 14, optical fiber pairs 3 and 4 are connected to each other by means of a fiber pair 5 which includes cross fibers 5a and 5b, and the optical transmission routes is cross-connected, extending from an optical fiber 3a through the cross fiber 5a to the optical fiber 4b and from an optical fiber 3b through the cross fiber 5b to an optical fiber 4a.

In the case shown in FIG. 15, on the other hand, the optical fiber pairs 3 and 4 are connected to each other by means of the fiber pair 5 which includes through fibers 5c and 5d, and the optical transmission routes are through-connected, extending from the optical fiber 3a through the through fiber 5c to the optical fiber 4a and from the optical fiber 3b through the through fiber 5d to the optical fiber 4b.

In the case shown in FIG. 16, moreover, the optical fiber pairs 3 and 4 are connected to each other by means of the fiber pair 5 which includes loop-back fibers 5e and 5f, and the optical transmission routes are loop-back-connected, extending from the optical fiber 3a through the loop-back fiber 5e to the optical fiber 3b and from the optical fiber 4a through the loop-back fiber 5f to the optical fiber 4b.

Presently, an optical switch which uses a planar lightwave circuit in place of the optical fibers is proposed as means for switching between the three states. In an optical switch shown in FIG. 17, for example, planar lightwave circuit components 6 and 7 are butt-connected to each other, and optical connectors 8 and 9 are butt-connected to the components 6 and 7, respectively. The connectors 8 and 9 are attached to the respective end portions of the optical fiber pairs 3 and 4.

In the planar lightwave circuit component 6, planar waveguides 6b, 6c, 6d and 6e are formed on a substrate 6a, and reflection mirrors M are arranged individually at bent portions of the planar waveguides 6d and 6e. Likewise, in the planar lightwave circuit component 7, planar waveguides 7b, 7c, 7d and 7e are formed on a substrate 7a, and reflection mirrors M are arranged individually at bent portions of the planar waveguides 7d and 7e.

Thus, in the cases illustrated, a light beam transmitted through the optical fiber 3a is delivered to the optical fiber 4a via the planar waveguides 6b and 7b, while a light beam transmitted through the optical fiber 3b is delivered to the optical fiber 4b via the planar waveguides 6c and 7c, whereby the optical fiber pairs 3 and 4 are through-connected.

When the optical switch is shifted in the manner shown in FIG. 18, the light beam transmitted through the optical fiber 3a is delivered to the optical fiber 4b via the planar waveguides 6b and 7c, while the light beam transmitted through the optical fiber 3b is delivered to the optical fiber 4a via the planar waveguides 6c, 7d, 6e and 7b in the order named, whereby the optical fiber pairs 3 and 4 are cross-connected.

When the optical switch is shifted in the manner shown in FIG. 19, moreover, the light beam transmitted through the optical fiber 3a is delivered to the optical fiber 3b via the planar waveguides 6b, 7d, 6e, 7e and 6c in the order named, while the light beam transmitted through the optical fiber 3b is delivered oppositely to the optical fiber 3a via the planar waveguides 6c, 7e, 6e, 7d and 6b in the order named, whereby the optical fiber pairs 3 and 4 are loop-back-connected.

In the photoswitch using the optical fibers shown in FIGS. 12 and 13, however, the fibers constituting the optical transmission routes are switched by means of the switching optical fibers 1c and 2c which are connected to each other with their respective end portions curved like a loop, so optical fibers are looped at each station.

Generally, in curving optical fibers, it is necessary to lower bending loss or prevent the breaking strength of the fibers from being lowered by bending distortion. In curving the fibers like a loop, therefore, the diameter of the curved fibers must be kept at about 60 mm or more. Thus, the photoswitch, which contains optical fibers with this diameter, is inevitably large-sized.

If the optical fibers are used to establish the three connection states, cross, through, and loop-back, as shown in FIGS. 14 to 16, the fiber arrangement is complicated, so that the cost, fiber storage spaces, etc. are not practical.

The problem of the optical fiber storage can be solved by the optical switch which uses the planar lightwave circuit shown in FIGS. 17 and 19. In this case, however, the planar lightwave circuit components 6 and 7 and the optical connectors 8 and 9, which constitute the optical switch, are butt-connected at the three regions between the connector 8 and the component 6, between the components 6 and 7, and between the component 7 and the connector 9. Inevitably, therefore, the connection loss of this optical switch is substantial, and the cost of the components of the switch is high.

SUMMARY OF THE INVENTION

An object of the present invention is to provide a waveguide-type optical switch of compact design, which can easily switch optical transmission routes between three states, i.e., cross, through, and loop-back states, without entailing a substantial optical signal transmission loss.

Another object of the invention is to provide a waveguide-type optical switch which uses a relatively small number of components, and therefore, is low-priced.

In order to achieve the above object, according to the invention, there is provided a waveguide-type optical switch which comprises: a first base including a substrate, a plurality of planar waveguide pairs having different optical connection functions and arranged at predetermined pair spaces on the substrate, and a set of butting end faces, the respective end faces of planar waveguides constituting the plurality of planar waveguide pairs being exposed on the butting end faces at predetermined pitches; and second and third bases each having a joint end face butted to each corresponding butting end face of the first base, and provided with at least a set of optical fiber pairs optically connected to optical transmission routes and arranged at the same pitch as the planar waveguides, the respective end faces of optical fibers constituting the set of optical fiber pairs being exposed on the joint end faces, wherein any of the first to third bases butt-connected to one another is moved parallel for the pair space of the planar waveguide pairs along the butting end face so that at least a set of optical fiber pairs of the second and third bases connected to a predetermined planar waveguide pair out of the plurality of planar waveguide pairs are optically connected to a desired planar waveguide pair, whereby the optical transmission routes are switched.

When at least one of the first to third bases is moved parallel along the butting end face, the planar waveguide pair which is optically connected with at least one of the optical fiber pair of the second and third bases is switched to the planar waveguide pair with another connection function, and the optical transmission routes are switched.

According to the planar waveguide-type optical switch of the present invention, the optical transmission routes are switched with the respective end faces of the bases joined together, so that it can be easily switched between three different states, i.e., cross, through, and loop-back states. Since the bases are butt-connected at two positions, moreover, connection loss can be restrained. Since the optical switch of the invention comprises only three components, the first to third bases, furthermore, it is compact and simple in construction, and therefore, can be produced at low cost.

The above and other objects, features, and advantages of the invention will be more apparent from the ensuing detailed description taken in connection with the accompanying drawings.

DETAILED DESCRIPTION OF THE PREFERRED EMBODIMENTS

On embodiment of a planar waveguide-type optical switch according to the present invention will now be described in detail with reference to the accompanying drawings of FIGS. 1 to 8. This embodiment is applied to a two-by-two photoswitch which can switch optical transmission routes between three states, i.e., cross, through, and loop-back states.

Figure 1:
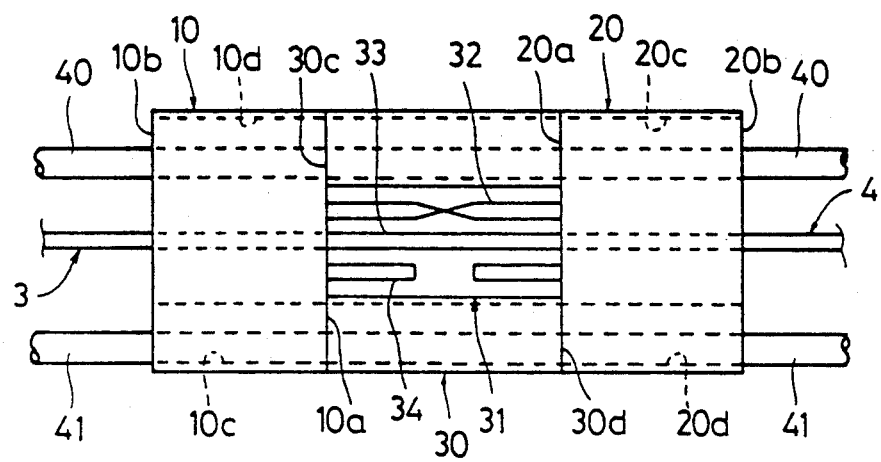
FIG. 1 is a plan view of a two-by-two photoswitch according to one embodiment of a planar waveguide-type optical switch of the present invention.

In the two-by-two photoswitch of the present embodiment, as shown in FIG. 1, connectors 10 and 20 and an intermediate connector 30 between them are butted, positioned by means of fitting pins 40 and 41, and connected for movement in the transverse direction. The connectors 10 and 20 constitute second and third bases, respectively, and the intermediate connector 30 a first base.

Since the connectors 10 and 20 are constructed in the same manner, only the one connector 10 will be described. For the other connector 20, like reference numerals are used to designate like portions throughout the drawings, and a description of those portions is omitted.

Figure 2:
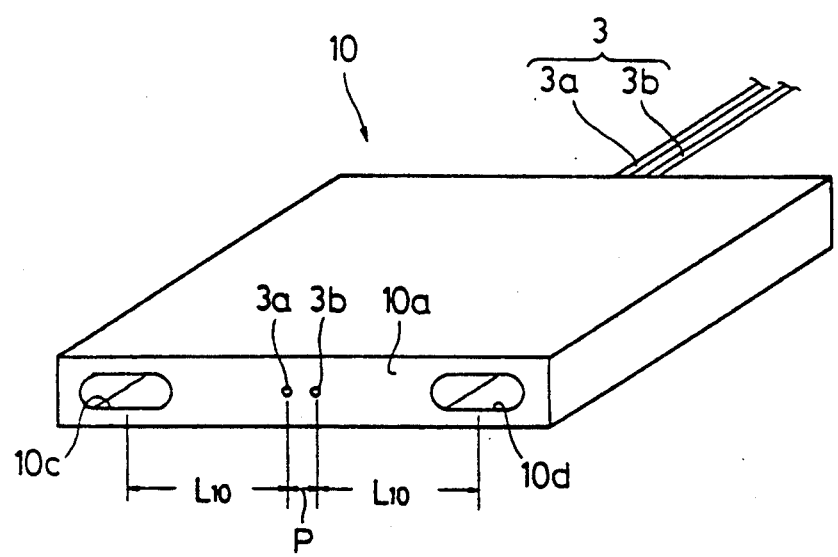
FIG. 2 is a perspective view of a connector constituting the two-by-two photoswitch of FIG. 1.
Figure 3:
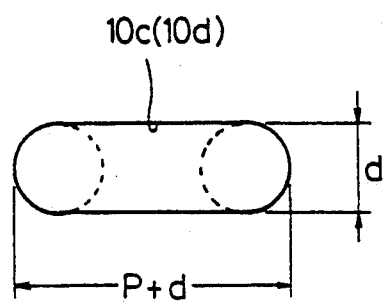
FIG. 3 is a front view showing the configuration of a pin hole of the connector of FIG. 2.

As shown in FIG. 2, the connector 10 is a rectangular prism-shaped member. Optical fibers 3a and 3b of an optical fiber pair 3, which are connected to the optical transmission routes, are arranged in the center of the connector 10, with respect to the transverse direction thereof, extending parallel to each other in the longitudinal direction with a fiber space p between them. The respective polished end faces of the optical fibers 3a and 3b are exposed in the center of a front joint end face 10a, and the terminal end side of the fiber pair 3 extends from a rear end face 10b (see FIG. 1). Further, pin holes 10c and 10d extend parallel to each other in the longitudinal direction, individually on the opposite sides of the connector 10 with respect to the transverse direction. As shown in FIG. 3, each pin hole is elongated in the transverse direction, having major and minor axes of lengths d and (P+d).

Figure 4:
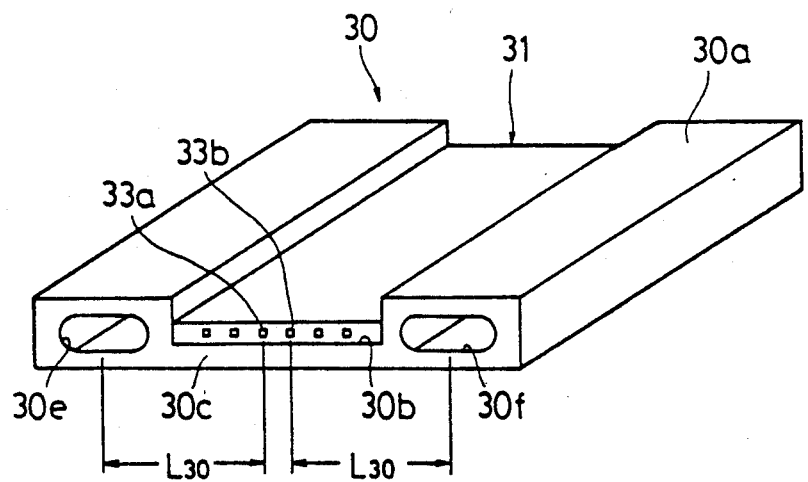
FIG. 4 is a perspective view of an intermediate connector constituting the two-by-two photoswitch of FIG. 1.

As shown in FIG. 4, the intermediate connector 30 is a substantially rectangular prism-shaped member, which is formed with a recess 30b in the center of its substrate 30a with respect to the transverse direction thereof. The front and rear parallel end faces of the connector 30 constitute butting end faces 30c and 30d (see FIG. 1 for 30d), respectively. A planar lightwave circuit 31 is formed in the recess 30b, and pin holes 30e and 30f are bored individually through the opposite side portions of the recess 30b, with respect the transverse direction, corresponding in position to the pin holes 10c and 10d of the connector 10, respectively. The pin holes 30e and 30f, like the pin holes 10c and 10d of the connector 10, are elongated in the transverse direction and having major and minor axes of lengths d and (P+d), and extend parallel to each other.

Figure 5:
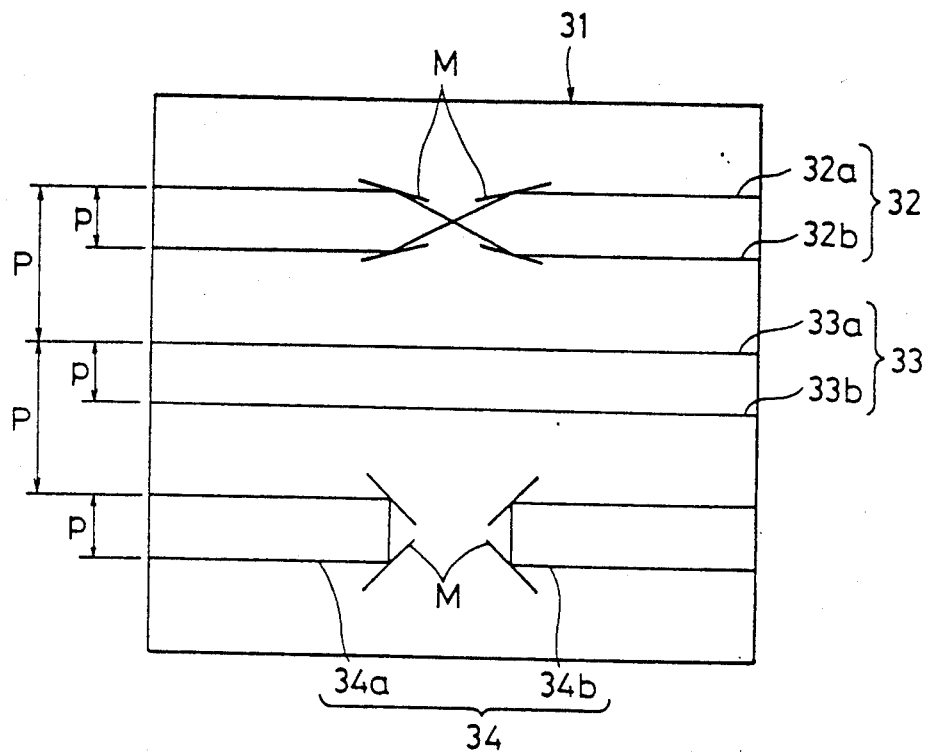
FIG. 5 is a plan view of a planar lightwave circuit of the intermediate connector shown in FIG. 4.
Figure 6:
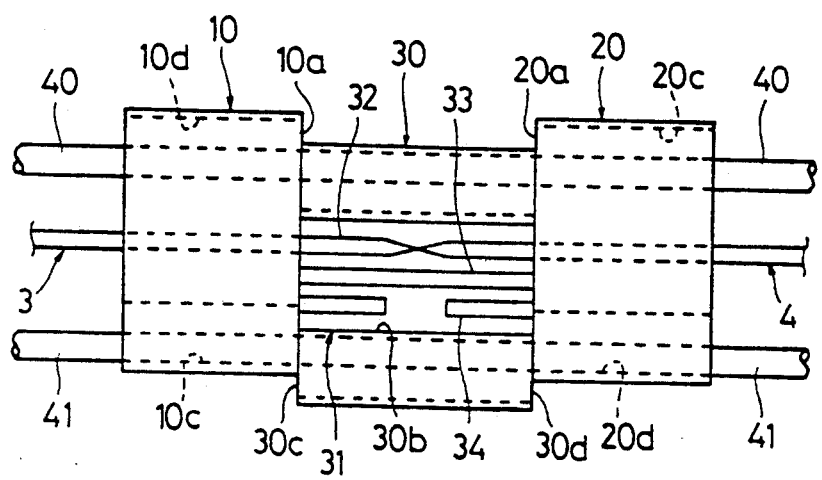
FIG. 6 is a plan view showing the two-by-two photoswitch of FIG. 1 in a cross state.

As shown in the plan view of FIG. 5, the planar lightwave circuit 31 is formed having three planar waveguide pairs 32, 33 and 34 arranged parallel to one another with pair spaces P between them. These pair spaces P serve as strokes or transfer pitches for the movement of the connectors when the connection is switched. The respective end faces of waveguides which constitute each waveguide pair are exposed on the butting end faces 30c and 30d of the connector 30, at pitches equivalent to the fiber space p of the optical fiber pair 3, and are polished.

As shown in FIG. 5, the waveguide pair 32 is designed so that waveguides 32a and 32b are bent and cross each other in the middle, and a reflection mirror M is disposed at each bent portion. The mirrors M nearly totally reflect a light beam transmitted through the waveguides 32a and 32b, and transmit the beam without entailing a transmission loss at the bent portions.

On the other hand, as shown in FIG. 5, the planar waveguide pair 33 is designed so that waveguides 33a and 33b linearly extend parallel to each other, and a distance $L_{30}$ (see FIG. 4) between the waveguide 33a and the center of the pin hole 30e or between the planar waveguide 33b and the center of the pin hole 30f is equal to a distance $L_{10}$ (see FIG. 2) between the center of the pin hole 10c of the connector 10 and the core center of the optical fiber 3a or between the center of the pin hole 10d and the core center of the optical fiber 3b.

As shown in FIG. 5, moreover, the planar waveguide pair 34 is designed so that planar waveguides 34a and 34b are bent at 90° at two intermediate positions, and reflection mirrors M similar to those for the planar waveguides 33a and 33b are arranged at these individual bent portions.

Each reflection mirror M can be manufactured by forming a reflective surface by dry etching after forming each planar waveguide pair on the substrate 30a, and then depositing a metal film or the like on the reflective surface.

The fitting pins 40 and 41 are passed through their corresponding pin holes 10d, 30f, 20c and pin holes 10c, 20d of the connectors 10, 20 and 30 so as to link them together, whereby the connectors 10 to 30 are positioned and connected for transverse movement. Thus, the diameter of the pins 40 and 41 is set equal to the minor axis length d of each pin hole.

The two-by-two photoswitch of the present embodiment is assembled in a manner such that the fitting pins 40 and 41 are fitted in their corresponding pin holes of the individual connectors, and the connectors 10 to 30 are butt-connected to one another, as shown in FIG. 1. The joint end faces 10a and 20a and their corresponding butting end faces 30c and 30d are opposed to one another with fine spaces between them or pressed against with one another under proper pressure so that the optical fibers and the planar waveguides can be optically connected. In this two-by-two photoswitch, moreover, the optical transmission routes can be switched by pressing the desired connector sideways.

Since the pin holes can be formed with an accuracy of 1 μm or less, the connectors 10, 20 and 30 can be accurately moved for the transfer pitch P. In this photoswitch, therefore, the connection between the desired optical fiber pair and planar waveguide pair can be switched without entailing misalignment or substantial loss.

In the transfer state of the two-by-two photoswitch shown in FIG. 1, the respective optical fiber pairs 3 and 4 of the connectors 10 and 20 are optically connected to the planar waveguide pair 33 of the intermediate connector 30, and the optical transmission routes are through-connected.

When the lateral face of the intermediate connector 30 is pressed down from the position shown in FIG. 1, the connector 30, guided by the fitting pins 40 and 41, is moved parallel for the transfer pitch P along the butting end faces 10a and 20a of the optical connectors 10 and 20. As a result, the photoswitch is shifted in the manner shown in FIG. 6, so that the respective optical fiber pairs 3 and 4 of the connectors 10 and 20 are optically connected to the planar waveguide pair 32 of the intermediate connector 30, and the optical transmission routes are cross-connected.

Figure 7:
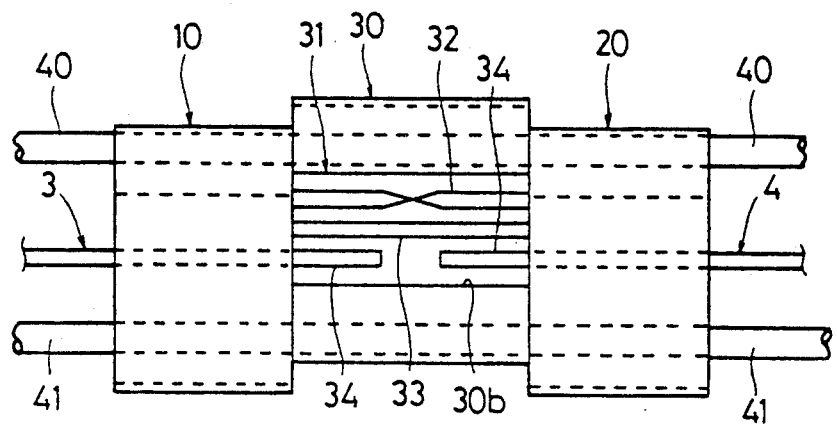
FIG. 7 is a plan view showing the two-by-two photoswitch of FIG. 1 in a loop-back state.

When the connectors 10 and 20 are moved from the position shown in FIG. 1 to shift the photoswitch to the state shown in FIG. 7, moreover, the respective optical fiber pairs 3 and 4 of the connectors 10 and 20 are optically connected to the planar waveguide pair 34 of the intermediate connector 30, and the optical transmission routes are loop-back-connected.

In the two-by-two photoswitch of the present embodiment constructed in this manner, the connectors 10 and 20 and the intermediate connector 30, guided by the fitting pins 40 and 41, can move for the transfer pitch P in the transverse direction, although they cannot move in the longitudinal direction along the optical fiber pairs 3 and 4. Since the connectors 10, 20 and 30 are moved parallel with their end faces joined together, the transmission loss caused by the switching of the optical transmission routes can be lowered. Since the optical fiber pairs and the planar waveguide pairs are optically connected by butt-connecting the connectors, moreover, they can be easily connected without the need of alignment between the optical fibers and the planar waveguides.

Figure 8:
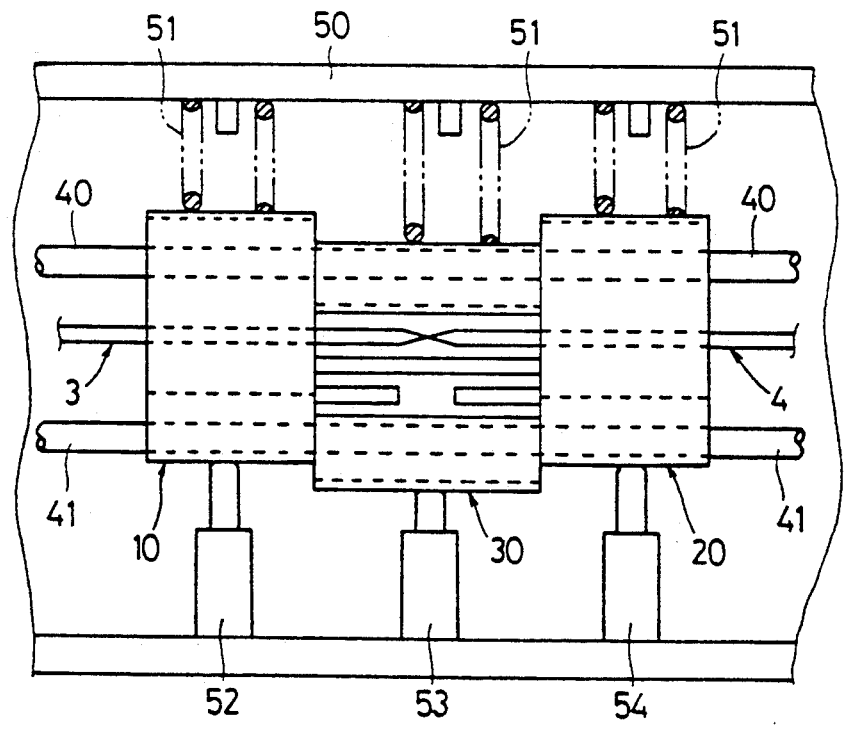
FIG. 8 is a plan view showing the two-by-two photoswitch of FIG. 1 which can be mechanically shifted by means of solenoids.

The connectors 10, 20 and 30 may be moved parallel by manual operation or by using electrical means, which includes springs 51 and solenoids 52 to 54 interposed between the connectors and a mounting frame 50 in which the photoswitch mounted, as shown in FIG. 8. In this case, a desired connector can be moved to switch the optical transmission routes freely by varying the mode of current supply to the solenoids 52 to 54. Further, impact which acts on the connectors as the optical transmission routes are switched is lightened by the springs 51, so that the connectors can be protected from damage.

Figure 9:
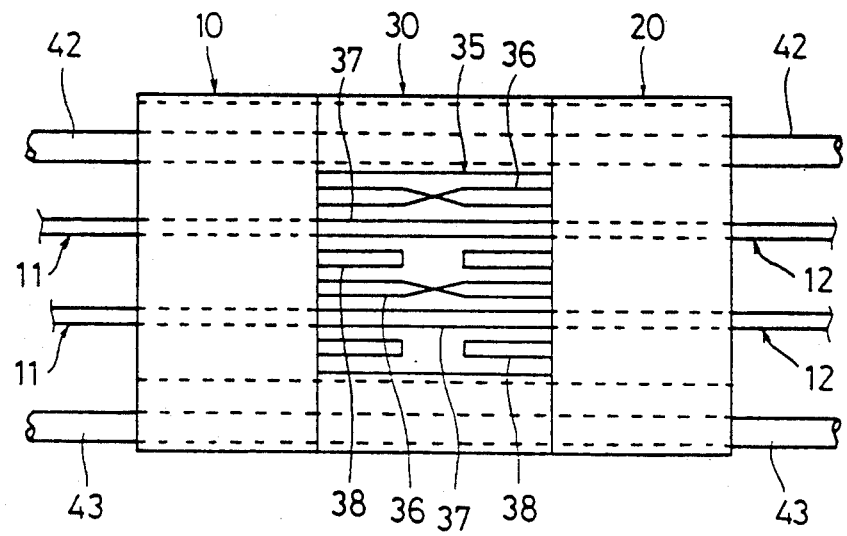
FIG. 9 is a plan view of a four-by-four photoswitch according to another embodiment of a planar waveguide-type optical switch of the present invention.
Figure 10:
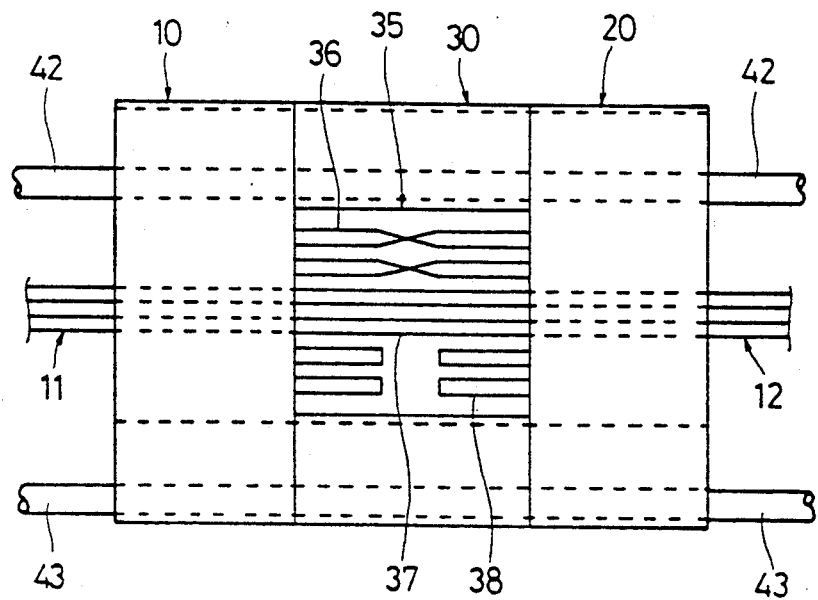
FIG. 10 is a plan view showing a modification of the four-by-four photoswitch of FIG. 9, in which planar waveguide pairs with each individual function are arranged in two adjacent rows.

According to the above embodiment, furthermore, the planar waveguide-type optical switch of the present invention is applied to the two-by-two photoswitch. However, the present invention is not limited to this embodiment, and may be also applied to four-by-four photoswitches, as shown in FIGS. 9 and 10. In these four-by-four photoswitches, two sets of optical fiber pairs 11 and 12 with the fiber spaces p between their individual fibers are arranged for connectors 10 and 20, respectively, and two sets of parallel planar waveguide pairs 36, 37 and 38 with the pair spaces P between them are formed corresponding to the pair sets, on a planar lightwave circuit 35 of an intermediate connector 30. In this arrangement, the connectors 10, 20 and 30 are positioned by means of fitting pins 42 and 43, and connected for movement in the transverse direction.

In the case of the four-by-four photoswitch shown in FIG. 9, the planar waveguide pairs are arranged in two sets with the pair spaces P between them, in the order of functions, cross, through, and loop-back. In the case of the four-by-four photoswitch shown in FIG. 10, the planar waveguide pairs with the same function are arranged in two adjacent rows with the pair space P between them. In this case, the major axis of the opening of each pin hole of each connector is adjusted to (2P+d), which is longer than (P+d) by the pair space P, since the planar waveguide pairs with the same function are arranged in two adjacent rows. In switching the optical transmission routes, the individual connectors are transversely moved for a distance twice the pair space P, that is, 2P.

Figure 11:
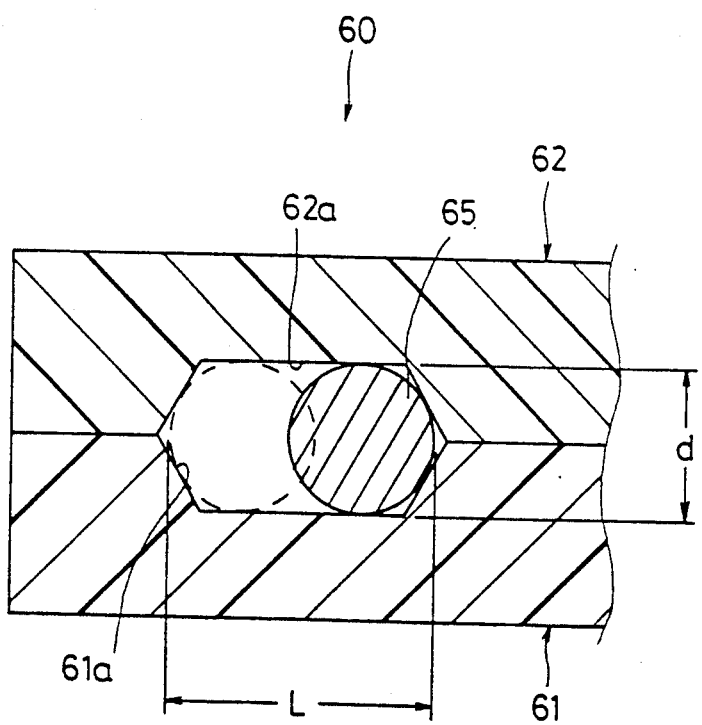
FIG. 11 is a sectional front view of a principal part of a connector, showing a modification of the pin hole.
Figure 12:
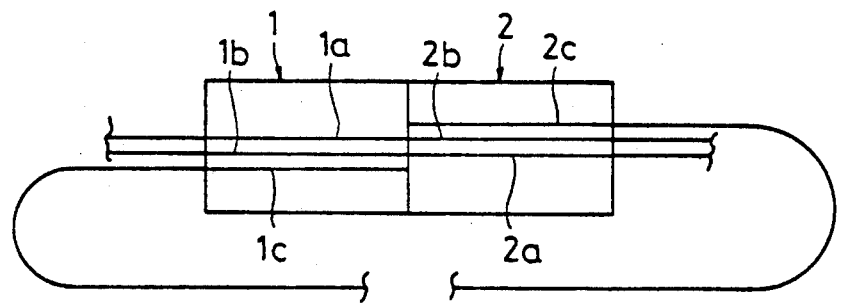
FIG. 12 is a plan view showing a optical switch related to the optical switch of the present invention.
Figure 13:
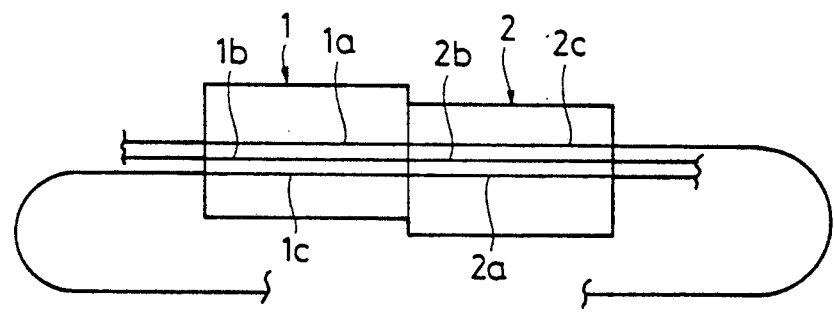
FIG. 13 is a plan view showing the optical switch of FIG. 12 in a shifted state.
Figure 14:
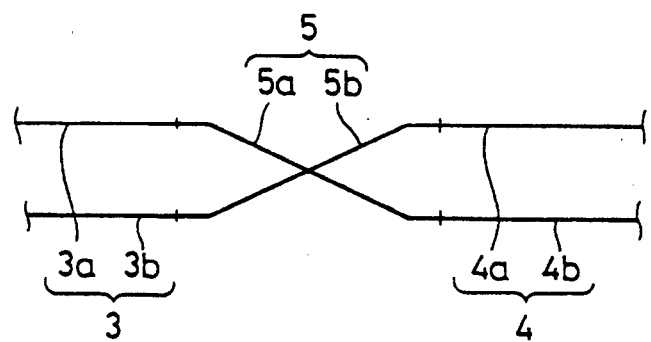
FIG. 14 is a plan view illustrating cross connection between two optical fiber pairs.
Figure 15:
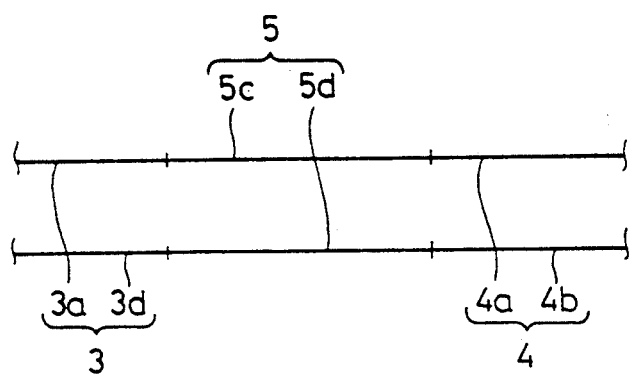
FIG. 15 is a plan view illustrating through connection between the two optical fiber pairs.
Figure 16:
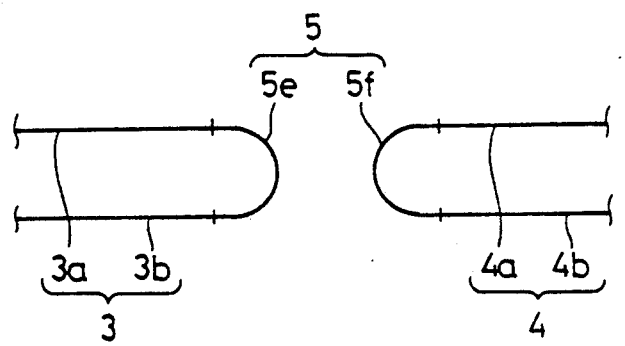
FIG. 16 is a plan view illustrating loop-back connection between the two optical fiber pairs.
Figure 17:
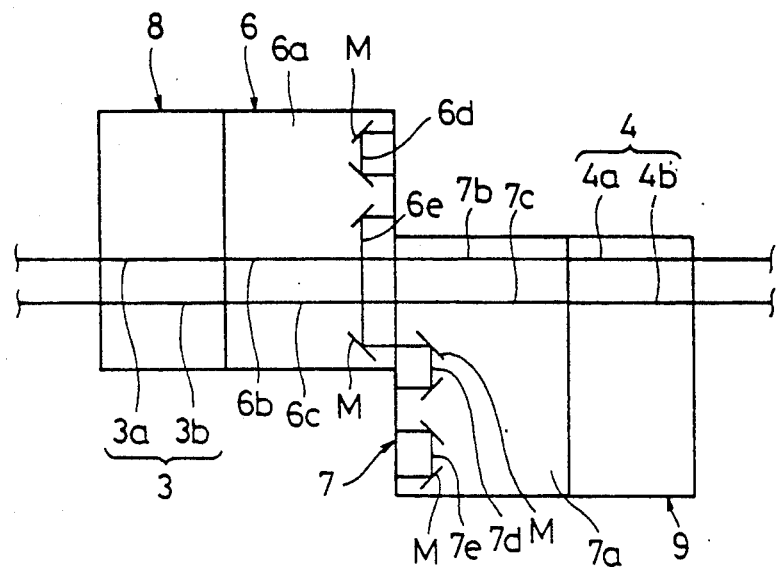
FIG. 17 is a plan view of an optical switch using a planar lightwave circuit related to the optical switch of the present invention, showing a state of through connection.
Figure 18:
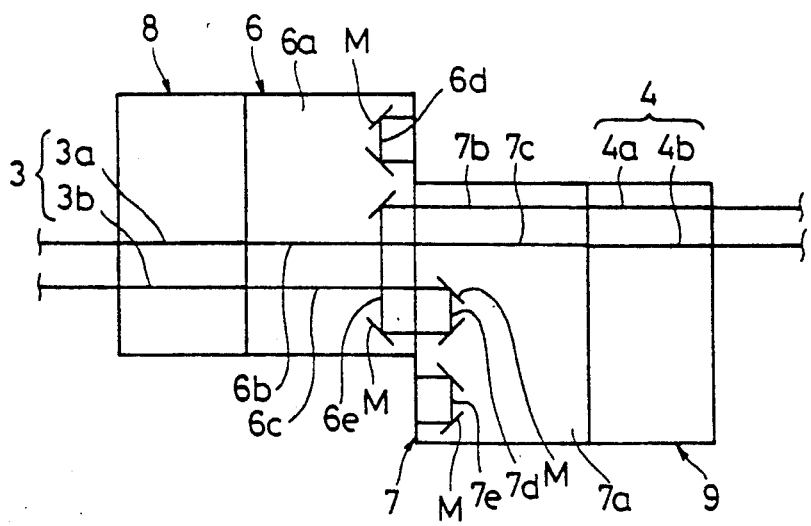
FIG. 18 is a plan view showing the optical switch of FIG. 17 in a cross state.
Figure 19:
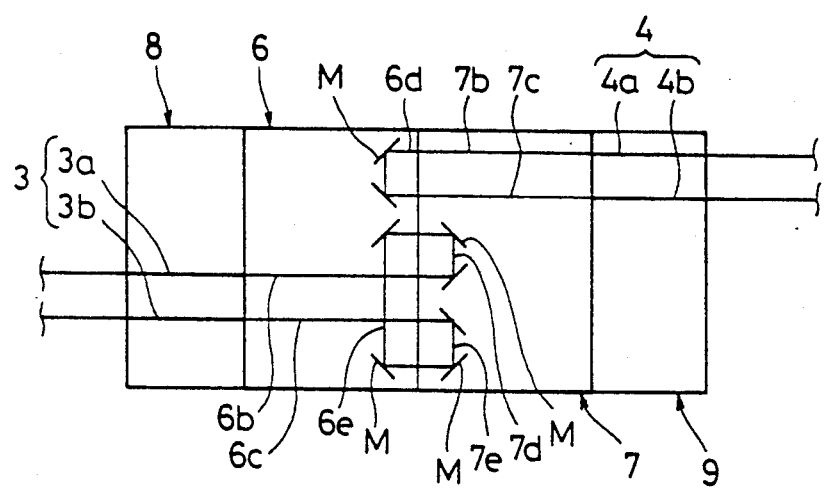
FIG. 19 is a plan view showing the optical switch of FIG. 17 in a loop-back state.

Further, although, in the above description, the connectors 10 and 20 and the intermediate connector 30 are constructed such that the pin holes 10c and 10d, the pin holes 20c and 20d, and the pin holes 30e and 30f each have the minor axis length d and the major axis length (P+d), the cross-sectional shape of each pin hole is not limited to an oval, if the connectors 10 to 30 are each made to be movable by the pair space P. For example, as shown in FIG. 11, an intermediate connector 60 may be composed of a connector substrate 61 having a trapezoid-groove 61a cut therein, and a cover plate 62 having a similar trapezoid-groove 62a cut therein and attached to the connector substrate 61, such that a pin hole having a hexagonal cross section is defined between the trapezoid-grooves 61a and 62a to permit the insertion of a fitting pin 65 having the diameter d therethrough. In this case, each of the trapezoid-grooves 61a and 62b are formed in such a manner the a length L (FIG. 11) of the pin hole defined by the grooves 61a and 62a is equal to (P+d), to thereby allow the fitting pin 65 to be moved by the pair space P.

What is claimed is:

1. A planar waveguide-type optical switch comprising:
    a first base including a substrate, a plurality of planar waveguide pairs having different optical connection functions and arranged at predetermined pair spaces on the substrate, and a set of butting end faces, the respective end faces of waveguides constituting the plurality of waveguide pairs being exposed on the butting end faces at predetermined pitches; and
    second and third bases each having a joint end face butted to each corresponding butting end face of the first base, and provided with at least a set of optical fiber pairs optically connected to optical transmission routes and arranged at the same pitch as the waveguides, the respective end faces of optical fibers constituting the set of optical fiber pairs being exposed on the joint end faces,
    wherein any of the first to third bases butt-connected to one another is moved parallel for the pair space of the waveguide pairs along the butting end face so that at least a set of optical fiber pairs of the second and third bases connected to a predetermined waveguide pair out of the plurality of waveguide pairs are optically connected to a desired waveguide pair, whereby the optical transmission routes are switched.

2. A waveguide-type optical switch according to claim 1, wherein said first base is arranged so that the plurality of waveguide pairs formed on the substrate have through, cross, and loop-back optical connection functions, individually.

3. A waveguide-type optical switch according to claim 2, wherein said waveguide pair having the cross optical connection function is arranged so that the waveguides constituting the waveguide pair are bent and cross each other, and a reflection mirror is disposed at each bent portion.

4. A waveguide-type optical switch according to claim 3, wherein said reflection mirror comprises a metal film formed on a reflective surface prepared by dry etching after forming each waveguide pair on the substrate.

5. A waveguide-type optical switch according to claim 2, wherein said waveguide pair having the loop-back optical connection function is arranged so that the waveguides constituting the waveguide pair are bent at 90° at two positions, and a reflection mirror is disposed at each bent portion.

6. A waveguide-type optical switch according to claim 5, wherein said reflection mirror comprises a metal film formed on a reflective surface prepared by dry etching after forming each waveguide pair on the substrate.

7. A waveguide-type optical switch according to claim 1, wherein said first to third bases each have two rows of pin holes on either side with respect to the transverse direction thereof, and are positioned by means of fitting pins, passed individually through the pin holes, at the time of butt connection.

8. A waveguide-type optical switch according to claim 7, wherein each said pin hole has a length longer than the diameter of each fitting pin by a margin for the pair space of the waveguide pairs.

* * * * *

UNITED STATES PATENT AND TRADEMARK OFFICE
CERTIFICATE OF CORRECTION

PATENT NO. : 5,177,804
DATED : January 5, 1993
INVENTOR(S) : SHIMIZU et al It is certified that error appears in the above-identified patent and that said Letters Patent is hereby corrected as shown below:

Title page, under Section [56] References Cited, insert the following:

<u>FOREIGN PATENT DOCUMENTS</u>

2,479,993  10/1981  France.....385/20X
3,012,450  10/1981  Germany....385/20X
0,352,900   1/1990  European Patent Office...385/20X <u>OTHER DOCUMENTS</u>:

PATENT ABSTRACTS OF JAPAN, Vol.12, No.319, August 1988, Nagasawa Shinji, OPTICAL FIBER SWITCH.

The Transactions of the IEICE, Vol.E70, No.8, August 1987, A NEW TYPE OF OPTICAL SWITCH WITH A PLASTIC-MOLDED FERRULE Signed and Sealed this Twenty-third Day of November, 1993

Attest:

BRUCE LEHMAN

Attesting Officer      Commissioner of Patents and Trademarks